US011553771B2

(12) United States Patent
Yoon

(10) Patent No.: US 11,553,771 B2
(45) Date of Patent: Jan. 17, 2023

(54) GRIP APPARATUS FOR PORTABLE DEVICE

(71) Applicant: Yeo-Sin Yoon, Seoul (KR)

(72) Inventor: Yeo-Sin Yoon, Seoul (KR)

(*) Notice: Subject to any disclaimer, the term of this patent is extended or adjusted under 35 U.S.C. 154(b) by 0 days.

(21) Appl. No.: 17/160,902

(22) Filed: Jan. 28, 2021

(65) Prior Publication Data

US 2021/0315339 A1  Oct. 14, 2021

(30) Foreign Application Priority Data

Apr. 14, 2020 (KR) .................. 20-2020-0001286

(51) Int. Cl.
| | | |
|---|---|---|
| *A45C 11/00* | (2006.01) | |
| *A45F 5/00* | (2006.01) | |
| *A45F 5/10* | (2006.01) | |
| *H04M 1/04* | (2006.01) | |
| *H04B 1/3888* | (2015.01) | |
| *H04B 1/3827* | (2015.01) | |

(52) U.S. Cl.
CPC .......... *A45C 11/00* (2013.01); *A45C 2011/002* (2013.01); *A45F 5/00* (2013.01); *A45F 5/10* (2013.01); *A45F 2200/0516* (2013.01); *H04B 2001/3861* (2013.01); *H04M 1/04* (2013.01)

(58) Field of Classification Search
CPC ...... A45F 2200/0516; A45F 5/00; A45F 5/10; H04M 1/04; H04B 2001/3861
See application file for complete search history.

(56) References Cited

U.S. PATENT DOCUMENTS

| | | | | |
|---|---|---|---|---|
| 8,374,657 | B2* | 2/2013 | Interdonato | H04B 1/385 455/575.4 |
| 8,833,620 | B2* | 9/2014 | Interdonato | A45F 5/00 224/217 |
| D721,373 | S* | 1/2015 | Logereau | D14/432 |
| 9,535,453 | B2* | 1/2017 | Dong | F16M 11/10 |
| 10,063,272 | B1* | 8/2018 | Yeo | H04B 1/3888 |
| 10,237,383 | B2* | 3/2019 | Park | H04M 1/04 |
| 10,349,728 | B2* | 7/2019 | Yoo | A45F 5/00 |
| 10,463,126 | B2* | 11/2019 | Mallory | A45F 5/00 |
| D877,154 | S* | 3/2020 | Hummel | D14/447 |
| 10,610,004 | B1* | 4/2020 | Yeo | A45F 5/10 |
| 10,623,543 | B2* | 4/2020 | Hummel | H04M 1/04 |
| 10,694,837 | B1* | 6/2020 | Altschul | H04B 1/3888 |
| D894,167 | S* | 8/2020 | Feller | D14/251 |
| D894,889 | S* | 9/2020 | Feller | D14/251 |
| D905,040 | S* | 12/2020 | Altschul | H04B 1/3888 D14/251 |

(Continued)

FOREIGN PATENT DOCUMENTS

| | | |
|---|---|---|
| JP | 04-048750 U | 4/1992 |
| KR | 20-0470332 Y1 | 12/2013 |
| KR | 10-1717074 B1 | 3/2017 |

*Primary Examiner* — Justin M Larson
(74) *Attorney, Agent, or Firm* — Bridgeway IP Law Group, PLLC; Sang Ho Lee; Hyun Woo Shin

(57) ABSTRACT

Provided is a grip apparatus for a portable device. The grip apparatus includes a base unit mounted on the portable device, a sliding hole formed in the base unit in a longitudinal direction of the base unit, a pair of sliders inserted into the sliding hole and independently movable along the sliding hole, and a band unit coupled to the pair of sliders and deformed to form a space, into which a finger is insertable, as at least one of the pair of sliders is moved.

3 Claims, 6 Drawing Sheets

(56) References Cited

U.S. PATENT DOCUMENTS

| | | | | |
|---|---|---|---|---|
| 10,856,633 | B2* | 12/2020 | Stagge | H04B 1/3877 |
| 10,911,587 | B1* | 2/2021 | Duval | H04M 1/04 |
| D916,073 | S * | 4/2021 | Li | D14/253 |
| 11,039,679 | B2* | 6/2021 | Jang | A45F 5/10 |
| D937,250 | S * | 11/2021 | Jakobuco | D14/250 |
| 2011/0309117 | A1* | 12/2011 | Roberts | H04M 1/04 224/217 |
| 2019/0055062 | A1* | 2/2019 | Winn | H04B 1/3888 |
| 2019/0246756 | A1* | 8/2019 | Mallory | A45F 5/10 |
| 2019/0281965 | A1* | 9/2019 | Yoo | A45F 5/10 |
| 2021/0153635 | A1* | 5/2021 | Vasquez | H04M 1/04 |
| 2021/0250056 | A1* | 8/2021 | Sung | H04B 1/3877 |
| 2021/0315339 | A1* | 10/2021 | Yoon | A45C 11/00 |

\* cited by examiner

GRIP APPARATUS FOR PORTABLE DEVICE

CROSS-REFERENCE TO RELATED APPLICATIONS

This application claims priority to and the benefit of Korean Patent Application No. 20-2020-0001286, filed on Apr. 14, 2020, the disclosure of which is incorporated herein by reference in its entirety.

BACKGROUND

1. Field of the Invention

The present invention relates to a grip apparatus for a portable device.

2. Discussion of Related Art

Recently, portable devices such as a smart phone and the like are being generally supplied and used, and such portable devices generally include a large screen and have a slim bar shape with flat front and rear surfaces.

Due to the above-described shape, a user has a difficulty in gripping a portable device such that there have been problems such as a risk of dropping or the like while the portable device is used and a large consumption of repairing costs when the portable device is damaged due to the dropping or the like.

Accordingly, a variety of apparatuses configured to stably grip a portable device and prevent dropping of the portable device have been developed.

SUMMARY OF THE INVENTION

The present invention is directed to providing a grip apparatus for a portable device which stably grips the portable device.

According to an aspect of the present invention, there is provided a grip apparatus including a base unit mounted on the portable device, a sliding hole formed in the base unit in a longitudinal direction of the base unit, a pair of sliders inserted into the sliding hole and independently movable along the sliding hole, and a band unit coupled to the pair of sliders and deformed to form a space, into which a finger is insertable, as at least one of the pair of sliders is moved.

A protrusion portion may be formed to protrude from an inner circumferential surface of the sliding hole to maintain a state in which the slider has been moved.

The protrusion portion may include a tilted surface provided in a movement direction of the slider so as to reduce resistance while the slider moves across the protrusion portion.

An insertion hole may be formed in the base unit and disposed on an end of the sliding hole to allow the slider to be insertable into the sliding hole.

The insertion hole may be formed to correspond to a side cross-sectional shape of the slider to allow the slider to be insertable in a lateral direction.

An inner circumferential surface of the insertion hole toward the sliding hole may be formed to be tilted in a direction toward the sliding hole.

A support portion may be disposed on a movement path of the slider to protrude from the base unit to support a position of the slider.

The support portion may include a tilted surface to allow the slider to move across the support portion when receiving an external force that is greater than a preset value.

A tilted surface of the support portion toward a center of the sliding hole may be more gradual than a tilted surface of the support portion toward the slider.

The support portion may be formed to extend along an outer circumference of the slider.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
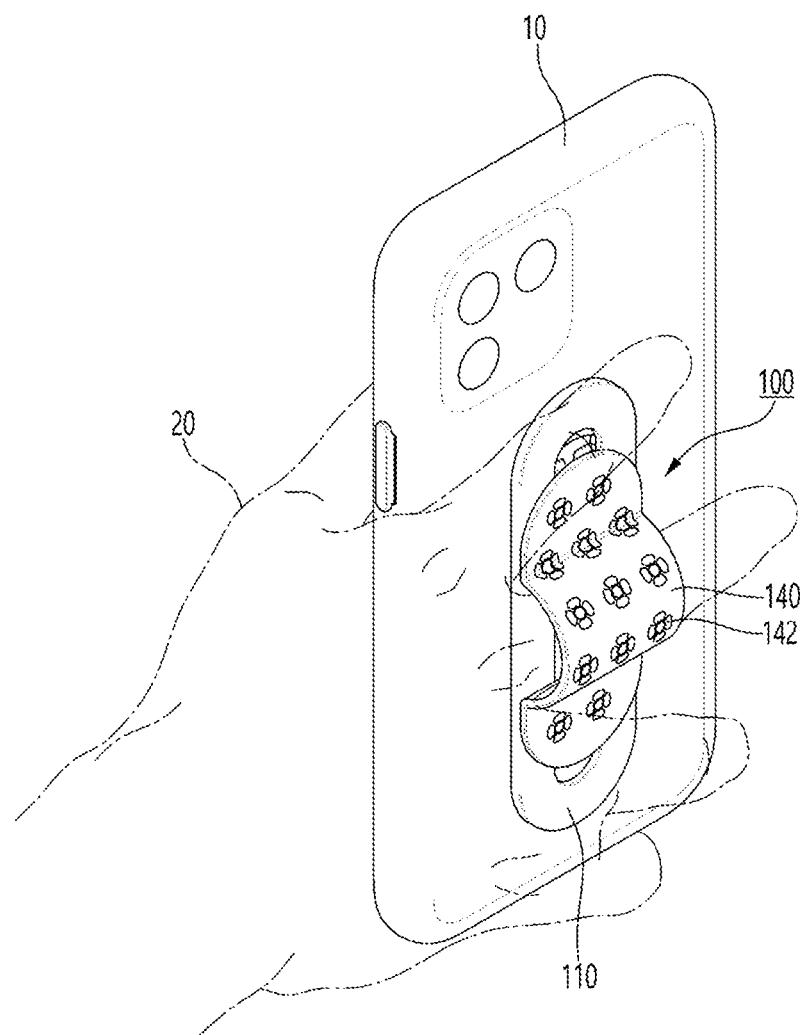
FIG. 1 is a perspective view illustrating a state in which a grip apparatus for a portable device according to one embodiment of the present invention is mounted on a portable device.

Since the present invention may be variously modified and have a variety of embodiments, particular embodiments will be illustrated in the drawings and described in detail hereinafter. However, these are not intended to limit the present invention to a particularly disclosed form and it should be understood that the present invention includes all changes, equivalents, and substitutes included within the concept and technical scope of the present invention. In a description of the embodiments of the present invention, a detailed description of well-known components or functions of the related art will be omitted when it is deemed to obscure understanding of the embodiments of the present invention.

The terms such as first, second, and the like may be used to describe a variety of components, and these components are not limited to the terms. The terms are used only for distinguishing one component from another.

The terms used herein are used merely for describing particular embodiments and are not intended to limit the present invention. Singular expressions, unless clearly defined otherwise in context, include plural expressions. Throughout the application, the terms "comprise," "have," and the like are used herein to specify the presence of stated features, numbers, stages, operations, elements, components or combinations thereof but do not preclude the presence or addition of one or more other features, numbers, stages, operations, elements, components, or combinations thereof.

Hereinafter, embodiments of a grip apparatus 100 for a portable device according to the present invention will be described in detail with reference to the attached drawings. In a description with reference to the attached drawings, equal or corresponding components will be referred to as equal reference numerals and a repetitive description thereof will be omitted.

According to the embodiment, as shown in FIGS. 1 to 4D, the grip apparatus 100 includes a base unit 110 mounted on a portable device 10, a sliding hole 120 formed in the base unit in a longitudinal direction of the base unit 110, a pair of sliders 130 which are inserted into the sliding hole 120 and independently slidable along the sliding hole 120, and a band unit 140 coupled to the pair of sliders 130 and deformed to form a space into which a finger 20 is insertable as at least one of the pair of sliders 130 is moved.

According to the embodiment, as the pair of sliders 130 are independently moved along the sliding hole 120 and at least one of the pair of sliders 130 is moved, the band unit 140 coupled to the sliders 130 is deformed and the space into which the finger 20 is insertable is formed so that a user may to stably grip the portable device 10 by inserting the finger 20 into the corresponding space.

Hereinafter, respective components of the grip apparatus 100 according to the embodiment will be described with reference to FIGS. 1 to 5.

The base unit 110 may be mounted on the portable device 10 as shown in FIG. 1. Accordingly, the base unit 110 may allow the apparatus of the present invention, which is configured to stably grip the portable device 10, to be mounted on and supported by the portable device 10.

Also, as shown in FIGS. 1 to 4D, the base unit 110 may perform a function of a base on which other components configured to achieve objects and functions of the present invention may operate and actions between the components may be performed.

The sliding hole 120 may be formed in the base unit 110 in the longitudinal direction of the base unit 110 as shown in FIGS. 2 to 5. In this case, the sliders 130 are movable through the sliding hole 120 so that the band unit 140 may be deformed and the space into which the finger 20 is insertable may be formed.

Figure 2:
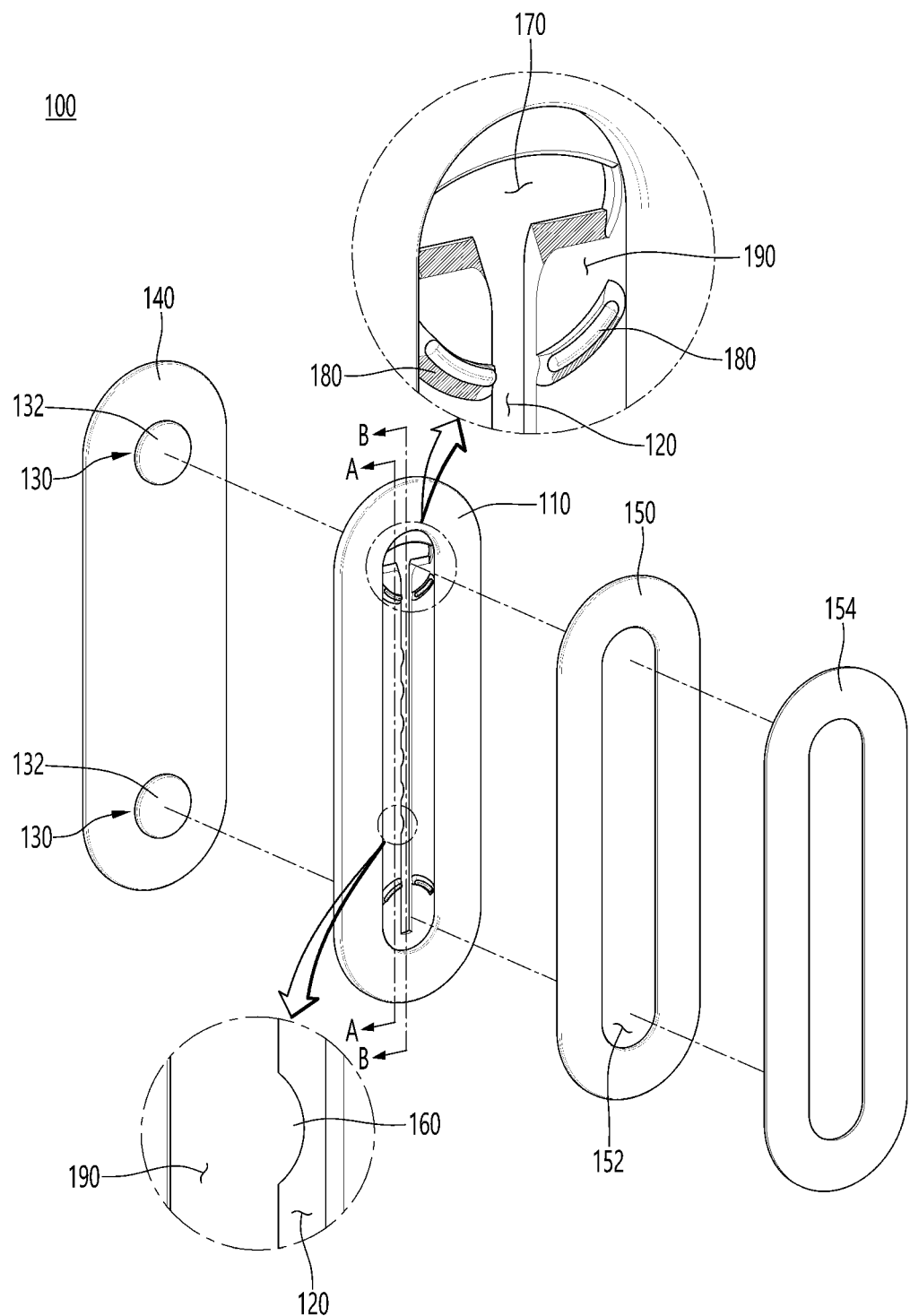
FIG. 2 is an exploded perspective view of the grip apparatus according to one embodiment of the present invention.

As shown in FIG. 2, an attachment portion 150 may be formed on the base unit 110 to attach or detach the base unit 110 to or from the portable device 10.

Accordingly, as described above, the base unit 110 may be mounted on the portable device 10 using the attachment portion 150. Also, the attachment portion 150 is formed to be detachable to allow the user to change a position of the base unit 110 mounted on the portable device 10 as necessary.

In more detail, the attachment portion 150 may include an adhesive, a gel pad, and the like and be formed to have a thickness not to allow the sliders 130 to come into contact with the portable device 10 while moving as described below.

Also, in the attachment portion 150, as shown in FIG. 2, an interference prevention hole 152 may be formed to prevent the sliders 130 from being interfered with. In more detail, the interference prevention hole 152 may be formed to correspond to a shape of a protrusion prevention groove 190 which will be described below.

As shown in FIG. 2, a variant cover 154 may be attached to the attachment portion 150 to be variable to prevent the attachment portion 150 from being contaminated. Accordingly, the variant cover 154 may prevent the attachment portion 150 from being degraded in adhesion due to foreign substances being coupled thereto so that the user may separate the apparatus as necessary and attach the variant cover 154 thereto to store for later use.

In more detail, as shown in FIG. 2, the variant cover 154 may be formed to cover the attachment portion 150 to effectively protect the attachment portion 150 or be formed to correspond to a shape of the attachment portion 150. Also, the variant cover 154 may include a film, a coating sheet, or the like.

As shown in FIGS. 2, 4A to 4D, and 5, a protrusion portion 160 may be formed to protrude from an inner circumferential surface of the sliding hole 120 to maintain a state in which the slider 130 has been moved.

That is, the protrusion portion 160 may maintain the state, in which the sliders 130 have been moved, by supporting the moved sliders 130 in a direction opposite to movement thereof to prevent the sliders 130 from freely or randomly moving.

As shown in FIGS. 2, 4A to 4D, and 5, the protrusion portion 160 may include a tilted surface provided in a movement direction of the sliders 130 so as to reduce resistance while the sliders 130 move across the protrusion 160.

Accordingly, as described above, the sliders 130 may be supported by the protrusion portion 160 in the direction opposite the movement and may move across the protrusion portion 160 through the tilted surface provided on the protrusion portion 160 in the movement direction.

In more detail, as shown in FIGS. 2, 4A to 4D, and 5, the tilted surface of the protrusion portion 160 may be formed as a curved surface convex toward the sliding hole 120 so that reduction in resistance against the movement of the sliders 130 and supporting of the sliders 130 may be organically performed together.

As shown in FIGS. 2, 4A to 4D, and 5, a plurality of such protrusion portions 160 may be formed. The plurality of protrusion portions 160 may be arranged to be spaced apart from each other. Accordingly, the above-described function of the protrusion portions 160 may be performed in a wider movement section inside the sliding hole 120.

In more detail, the plurality of protrusion portions 160 may be spaced at the same intervals apart. In this case, since a position at which a movement state of the slider 130 is maintained is uniformly provided in the sliding hole 120, the user may more easily determine a position of the slider 130 in the sliding hole.

Figure 5:
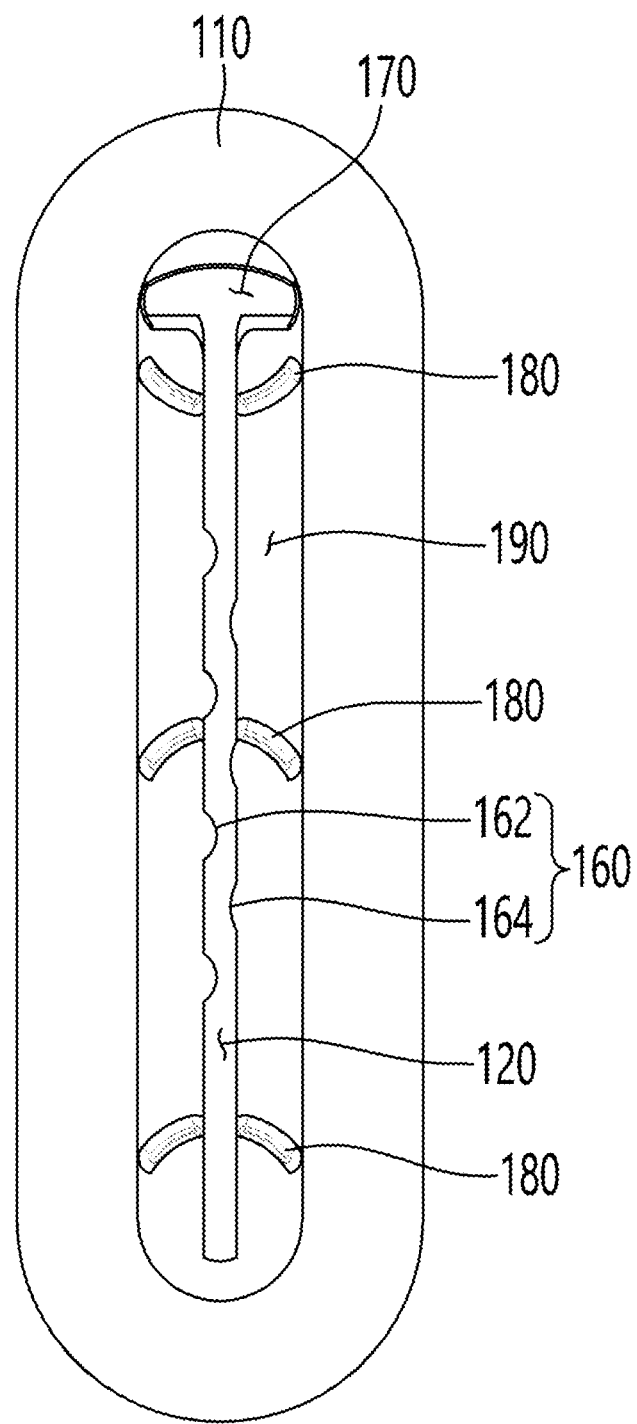
FIG. 5 is a rear view illustrating a base unit according to one embodiment of the present invention.

As shown in FIG. 5, the protrusion portions 160 may include a first protrusion 162 formed on one side of the inner circumferential surface of the sliding hole 120 and a second protrusion 164 formed on the other side of the inner circumferential surface of the sliding hole 120.

Accordingly, the state in which the slider 130 has been moved may be more effectively maintained through the first protrusion 162 and the second protrusion 164 formed on both sides of the inner circumferential surface of the sliding hole 120.

Also, as shown in FIG. 5, the first protrusion 162 and the second protrusion 164 may be alternately disposed.

For example, when the slider 130 is supported by the first protrusion 162, the second protrusion 164 disposed to alternate with the first protrusion 162 may perform a function of pressurizing the slider 130 to allow the slider 130 to be more effectively supported by the first protrusion 162.

In more detail, as shown in FIG. 5, a plurality of such first protrusions 162 and a plurality of such second protrusions 164 may be formed. Accordingly, an effect caused by an interaction between the first protrusions 162, the sliders 130, and the second protrusions 164 may be generated in a wider movement section in the sliding hole 120.

A tilted surface of the second protrusion 164 may be formed to be more gradual than a tilted surface of the first protrusion 162 as shown in FIG. 5.

Accordingly, the first protrusion 162 may generally perform a function of supporting the slider 130 and the second protrusion 164 may assist the first protrusion 162 as well as reducing resistance due to the protrusion portions 160 while the slider 130 moves.

As shown in FIGS. 2 to 5, an insertion hole 170 may be formed in the base unit 110 and disposed on an end of the sliding hole 120 to allow the slider 130 to be insertable into the sliding hole 120.

That is, the slider 130 may be inserted into the sliding hole 120 through the insertion hole 170 and moved therein. As the insertion hole 170 is disposed on the end of the sliding hole 120, interference of the insertion hole 170 with relation to the movement of the slider 130 may be reduced.

As shown in FIGS. 2 to 5, the insertion hole 170 may be formed to correspond to a side cross-sectional shape of the slider 130 to allow the slider 130 to be insertable in a lateral direction.

Accordingly, the insertion hole 170 may allow the slider 130 to be insertable therethrough as well as preventing the slider 130 from being separated in a direction in which the slider 130 is inserted after the slider 130 is inserted and mounted.

Also, an inner circumferential surface of the insertion hole 170 toward the sliding hole 120 may be tilted toward the sliding hole 120 as shown in FIGS. 2 to 5.

In this case, the slider 130 may not only be easily inserted into the insertion hole 170 but may also be introduced into the sliding hole 120 along the tilted surface of the insertion hole 170.

As shown in FIGS. 2 to 5, a support portion 180 may be disposed on a movement path of the slider 130 to protrude from the base unit 110 so as to support a position of the slider 130.

That is, since the support portion 180 supports the slider 130 with respect to the movement direction of the slider 130, it is possible to prevent the slider 130 from being freely or randomly moved in the sliding hole 120.

Figure 3A:
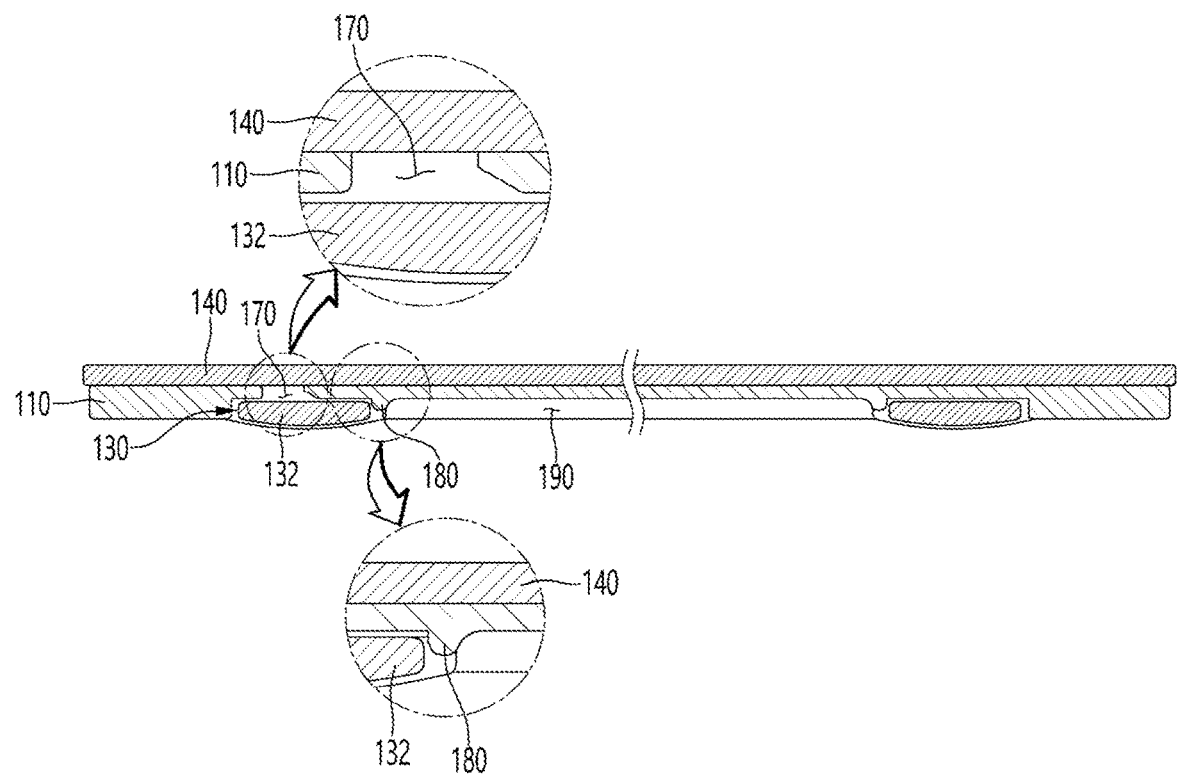
FIGS. 3A and 3B are cross-sectional views of the grip apparatus taken along line A-A and line B-B of FIG. 2, respectively.
Figure 3B:
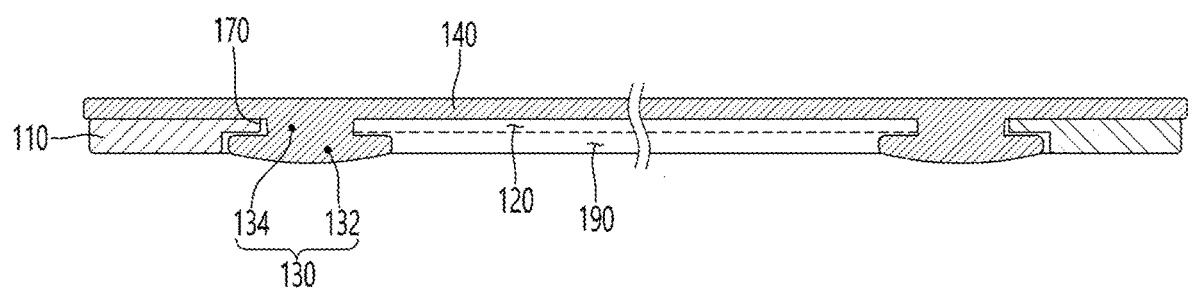

As shown in FIGS. 2, 3A, and 3B, the support portion 180 may include a tilted surface to allow the slider 130 to move across the support portion 180 when the slider 130 receives an external force that is greater than a preset value.

That is, since the slider 130 may move across the support portion 180 only when receiving the external force that is greater than the preset value, it is possible to more effectively support the slider 130.

Also, since the support portion 180 includes the tilted surface, when the slider 130 receives the external force that is greater than the preset value, the slider 130 may move across the support portion 180 through the tilted surface.

In more detail, a tilted surface of the support portion 180 toward a center of the sliding hole 120 may be more gradual than a tilted surface of the support portion 180 toward the slider 130 as shown in FIGS. 3A and 3B.

Accordingly, when the slider 130 is supported by the support portion 180 and receives the external force, moves across the support portion 180, and returns to a position at which the slider 130 is supported, the slider 130 may more easily move across the support portion 180.

Also, as shown in FIGS. 2 to 5, the support portion 180 may be disposed to support the slider 130 from the end of the sliding hole 120.

That is, since the slider 130 is located at the end of the sliding hole 120 and then moved along the sliding hole 120, the slider 130 is supported at the end of the sliding hole 120 which becomes a starting point of movement so that the user may determine whether to move the slider 130 by determining whether to apply an external force thereto.

In more detail, any one of such support portions 180 may protrude further or have a greater width than another as shown in FIG. 5.

Accordingly, any one of the pair of sliders 130 disposed on both ends of the sliding hole 120 may be more strongly supported by the support portion 180 than the other to perform a function of a movement end as well as performing a function of a fixing end.

As shown in FIGS. 2, 4A to 4D, and 5, the support portion 180 may be formed to extend along an outer circumference of the slider 130. Accordingly, since points of support between the slider 130 and the support portion 180 increase, the slider 130 may be more effectively supported by the support portion 180.

As shown in FIG. 5, the support portion 180 may be disposed at a preset position on the movement path of the slider 130 to maintain a shape of the band unit 140 which is deformed according to movement of the slider 130.

That is, since the slider 130 may be supported by the support portion 180 disposed at the preset position on the movement path of the slider 130 so as to maintain the deformed shape of the band unit 140, the apparatus of the present invention may be utilized as an apparatus for grip and as a holder for holding the portable device 10 on a bottom surface.

As shown in FIGS. 2 to 5, the protrusion prevention groove 190 may be formed in the base unit 110 along the sliding hole 120 to prevent the slider 130 inserted in the sliding hole 120 from protruding further than a surface of the base unit 110.

Accordingly, the base unit 110 may be easily attached to the portable device 10, and the slider 130 may be prevented from coming into contact with the portable device 10.

In more detail, as shown in FIGS. 2 and 4A to 4D, the protrusion prevention groove 190 may be formed to have a width corresponding to a width of the slider 130 to guide movement of the slider 130. Accordingly, the slider 130 may move stably along the sliding hole 120.

As shown in FIGS. 1 to 4D, the band unit 140 may be coupled to the pair of sliders 130 and be deformed to form the space into which the finger 20 is insertable as at least one of the pair of sliders 130 is moved.

That is, as the sliders 130 coupled to the band unit 140 move such that an interval between the pair of sliders 130 decreases, the band unit 140 forms a bent surface so that the space into which the finger 20 is insertable may be formed between the band unit 140 and the base unit 110.

In more detail, the band unit 140 may include a soft material. In this case, as described above, the bent surface formed by the band unit 140 may be formed to be flexible.

Also, the soft material may include thermoplastic polyurethane (TPU). TPU is plastic having rubber elasticity and has high flexibility so that the band unit 140 may be easily deformed and have high durability. Even when the band unit 140 is deformed a plurality of times, the band unit 140 may be prevented from being cracked or torn.

As shown in FIG. 1, the band unit 140 may include an image 142 printed on an outer surface thereof. Accordingly, a variety of such images 142 may be printed on the outer surface of the band unit 140 so that the apparatus of the present invention may be utilized for sales promotion or for decoration of the portable device 10.

As shown in FIGS. 2 to 4D, the pair of sliders 130 may be inserted into the sliding hole 120 and be independently movable along the sliding hole 120. Accordingly, the space in which the finger 20 is inserted and which is formed by deformation of the band unit 140 may be formed in a variety of positions on the sliding hole 120. Implementation examples thereof will be described as follows.

Figure 4A:
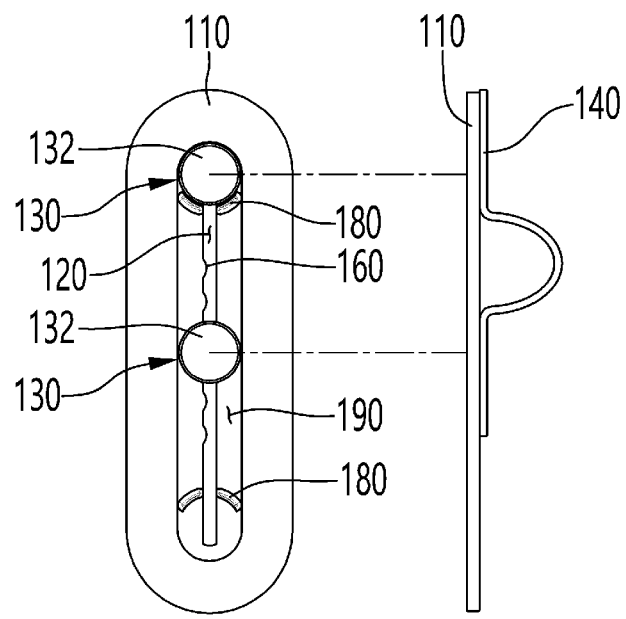
FIGS. 4A to 4D are views illustrating a process in which a band unit forms a finger-insertable space as a slide moves according to one embodiment of the present invention.
Figure 4B:
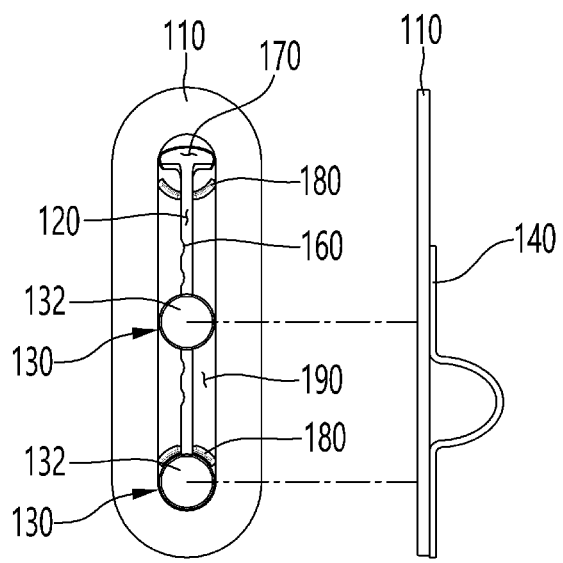
Figure 4C:
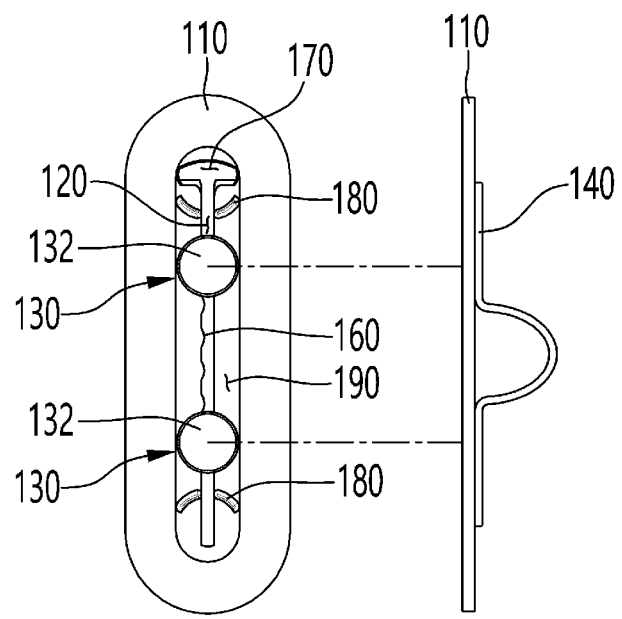

FIGS. 4A and 4B illustrate a state in which only one of the pair of sliders 130 is moved and then the space into which the finger 20 is inserted is formed in the other. Also, FIG. 4C illustrates a state in which both the pair of sliders 130 are moved and then the space into which the finger 20 is inserted is formed in the center of the sliding hole 120. In this case, degrees of movement of the pair of sliders 130 differ from each other so that the space into which the finger 20 is inserted may be formed at a variety of positions on the sliding hole 120.

As shown in FIGS. 2, 3A, and 3B, the slider 130 may include a body portion 132 formed to have a greater width than a width of the sliding hole 120 so as to be prevented from being separated through the sliding hole 120 after being inserted into the sliding hole 120 and a connection portion 134 formed to connect the body portion 132 to the base unit 110 and to be movable along the sliding hole 120.

Figure 4D:
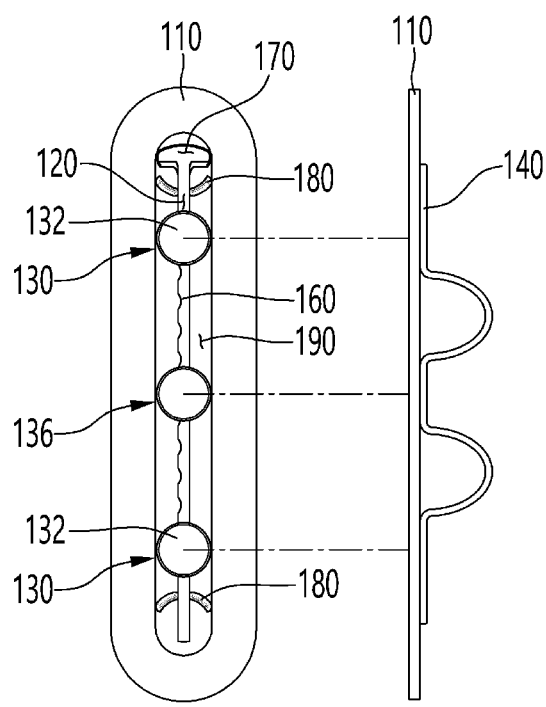

As shown in FIG. 4D, the grip apparatus 100 may further include an additional slider 136 disposed between the pair of sliders 130. The pair of sliders 130 may be disposed on both ends of the sliding hole 120, and the additional slider 136 may be disposed between both ends of the sliding hole 120.

In this case, since a plurality of such spaces into which the finger 20 is inserted are formed as a plurality of such sliders 130 are moved, the user may more stably grip the portable device 10 by inserting a plurality of such fingers 20 into the corresponding spaces.

According to the present invention, a portable device can be stably gripped.

Although one embodiment of the present invention has been described above, it should be noted that one of ordinary skill in the art may make a variety of modifications and changes of the present invention by adding, changing, eliminating, inserting, or the like of components without departing from the concept of the present invention which is disclosed in the claims and they will be included within the scope of the present invention.

What is claimed is:

1. A grip apparatus for a portable device, the grip apparatus comprising:
   a base unit mountable on the portable device;
   a sliding hole formed in the base unit in a longitudinal direction of the base unit;
   a protrusion prevention groove formed in the base unit to have a greater width than a width of the sliding hole and to extend along the sliding hole, wherein the protrusion portion protrudes laterally from an inner circumferential surface of the sliding hole;
   a pair of sliders inserted into the sliding hole and independently movable along the sliding hole, wherein at least one of the pair of sliders comprises:
      a body portion formed to have a greater width than a width of the sliding hole and located in the protrusion prevention groove as the at least one of the pair of sliders is inserted into the sliding hole; and
      a connection portion interposed between the body portion and a band unit and located in the sliding hole as the at least one of the pair of sliders is inserted into the sliding hole;
   the band unit coupled to the pair of sliders and configured to deform to form a space, into which a finger is insertable, as at least one of the pair of sliders moves;
   a protrusion portion protruding from an inner circumferential surface of the sliding hole to maintain a state in which the at least one of the pair of sliders has moved,
   wherein the protrusion portion comprises a tilted surface provided in a movement direction of the at least one of the pair of sliders reducing resistance while the connection portion moves across the protrusion portion,
   wherein an inner circumferential surface of the end of the protrusion prevention groove is formed to correspond to a shape of an outer circumferential surface of the body portion, and
   a support portion protruding from a bottom surface of an end of the protrusion prevention groove and disposed on a movement path of the body portion to accommodate a position of the body portion, wherein the body portion is surrounded and supported by the inner circumferential surface of the protrusion prevention groove and the support portion at the end of the protrusion prevention groove,
   wherein the support portion comprises a tilted surface to allow the body portion to move across the support portion when receiving an external force that is greater than a preset value, and the tilted surface of the support portion toward a center of the sliding hole is more gradual than the tilted surface of the support portion toward an end of the sliding hole, and
   wherein the support portion is formed to extend along the outer circumferential surface of the body portion.

2. The grip apparatus of claim 1,
further comprising an insertion hole formed in the base unit and disposed on an end of the sliding hole to allow the slider to be insertable into the sliding hole,
wherein the insertion hole is formed to correspond to a side cross-sectional shape of the slider to allow the slider to be insertable in a lateral direction.

3. The grip apparatus of claim 1, further comprising
an insertion hole formed in the base unit and disposed on an end of the sliding hole to allow the slider to be insertable into the sliding hole,
wherein an inner circumferential surface of the insertion hole toward the sliding hole is formed to be tilted in a direction toward the sliding hole.

* * * * *